(12) United States Patent
Zimmermann et al.

(10) Patent No.: US 6,723,405 B1
(45) Date of Patent: Apr. 20, 2004

(54) ADHESIVE TAPE AND ITS USE

(75) Inventors: Dieter Zimmermann, Jork (DE); Harald Kehler, Hamburg (DE); Walter Schulze, Pinneberg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/382,284

(22) Filed: Aug. 24, 1999

(30) Foreign Application Priority Data

Sep. 4, 1998 (DE) .......................................... 198 40 361

(51) Int. Cl.⁷ ................................................. C09J 7/00
(52) U.S. Cl. .................. 428/40.1; 427/208; 427/208.2; 428/41.9; 428/42.1; 428/346; 428/347; 428/354; 428/355; 428/906
(58) Field of Search .............................. 428/40.1, 41.9, 428/42.1, 346, 347, 354, 355, 906; 427/208.2, 208

(56) References Cited

U.S. PATENT DOCUMENTS

| | | | | |
|---|---|---|---|---|
| 4,131,709 A | * | 12/1978 | Schunck | ...................... 428/261 |
| 4,500,577 A | * | 2/1985 | Satake | .......................... 428/36 |
| 5,753,727 A | * | 5/1998 | Sato | ............................. 523/438 |

FOREIGN PATENT DOCUMENTS

| | | |
|---|---|---|
| DE | 2152871 | 4/1973 |
| DE | 33 31 016 A1 | 10/1984 |
| EP | 0 974 631 A2 | 1/2000 |
| JP | 74018772 | * 5/1974 |
| JP | 75012464 | * 5/1975 |
| JP | 75033701 B | * 11/1975 |

OTHER PUBLICATIONS

XP–002132808 Abstract of Database WPI Section Ch, Week 199039 Derwent Publications Ltd., London.
Derwent English Abstract of DE 33 31 016.
Derwent English Abstract of EP 0 974 631.
Derwent English Abstract of DE 2152871 (DT 2152871).

* cited by examiner

*Primary Examiner*—Nasser Ahmad
(74) *Attorney, Agent, or Firm*—Norris McLaughlin & Marcus

(57) ABSTRACT

Double-side adhesive tape for permanent adhesive bonds, comprising an adhesive composition based on
 a) thermoplastic rubber and
 b) tackifier resins,
 c) the adhesive composition comprising an admixed reactive resin.

18 Claims, No Drawings

ADHESIVE TAPE AND ITS USE

The invention relates to a double-side adhesive tape and to its use for permanent structural bonds.

Adhesive tapes for structural bonds are known and obtainable commercially. Such adhesive tapes are based on nitrile rubber and phenolic resins and are prepared from solutions.

Adhesive tapes for light bonds are likewise known and obtainable commercially. Known in particular are adhesive tapes for bonds which are re-releasable by pulling in the direction of the bond plane and are obtainable commercially under the designation "tesa Power-Strips®". Bonds produced with them offer a powerful hold. The strength levels achievable, however, are inadequate for structural bonds.

DE 3714453, DE 422849, DE 4233604, DE 4339604, DE 4428587, DE 4431914 and DE 19511288 describes specific embodiments and applications of abovementioned adhesive tapes. The adhesive tapes described in these documents are subjected to stringent requirements, for instance:

For flawless function they are required to offer a sufficient initial tack for the respective application (for light bonding=low application pressure and suitability for immediate load bearing) and bonding strength (during the period of application).

For longer-term bonds, appropriate ageing resistance in the joint is essential.

Under high mechanical stresses (high shear and tip-shear loads) it is possible, when using unsaturated styrene block copolymers (styrene, isoprene, styrene-butadiene block copolymers), for ozone cracks to form in the adhesive and, thus, for the adhesive tapes to tear during the release process or for the bonded article to become detached during the period of application.

For many applications it is desired to pigment the adhesive tape. The use of pigments, e.g. $TiO_2$, can, however, have an adverse effect on the bonding strength, especially at high concentrations. These adhesive films, however, are also inadequate for structural bonds.

Bonds with products in accordance with DE 33 31 016 (e.g. Power-Strip®) give rise to strengths in the range of 1–2 kg (in accordance with BDF test JO PMX 100, tip-shear durability test) and shear strengths of 30–80 $N/cm^2$ (in accordance with BDF adhesive strength JO PM 0020). In order to bring them within the range of structural adhesive bonds, however, higher values are required.

This object is achieved by a double-side adhesive tape for permanent adhesive bonds, comprising an adhesive composition comprising a mixture of thermoplastic rubber, tackifier resins and a reactive resin. The reactive resin may be a reactive alkyl phenol resin. The reactive resin may also be a heat-activatable resin. The reactive resin may make up from 10 to 30% by weight, in particular from 15 to 25% by weight, of the adhesive composition. The reactive resin may be employed together with a metal oxide, especially magnesium oxide. The reactive resin may make up from 1 to 3% by weight, in particular from 1.5 to 2.5% by weight, of the adhesive composition. The composition may be formulated so as to be adhesive. The adhesive tape may contain antioxidants, UV stabilizers, colorants, fillers and/or other customary auxiliaries. In one embodiment, the adhesive tape has a thickness of 0.2±0.1 mm. In another embodiment, the thermoplastic rubber is a styrene-butadiene block polymer and the tackifier resin is a rosin derivative. In a further embodiment, the mixture of raw materials is kneaded hot and extruded.

In particular, the use of reactive resin, preferably in combination with magnesium oxide, in combination with heat curing from the formulations of DE 33 31 016, gives rise to a structural adhesive tape having a certain fixing aid which is therefore particularly suitable for use in practice.

Particularly suitable reactive resins in accordance with the invention are alkylene phenol resins which, in particular, are base-reactive, as available in commerce as polychloroprene-based adhesives, e.g. as Alresen® PA 565 (Hoechst).

An advantage of the adhesive tape of the invention, furthermore, is that it is produced without solvents, in particular in a compounder/extruder.

The intention of the text below is to illustrate the invention by reference to examples without, however, pushing to impose on it any unnecessary restriction.

EXAMPLE 1

The reactive alkyl phenol resin (Alresen PA 565) from Hoechst was used in a formulation (with Pentalyn H from Hercules), all parts being by weight:

| | | |
|---|---|---|
| 53.5 Cariflex TR 1101 ® | Shell | (thermoplastic rubber) |
| 25.2 Pentalyn H ® | Hercules | (tackifier resin) |
| 16.9 Alresen PA 565 ® | Hoechst | (reactive alkyl phenol resin) |
| 2.2 Kronos 2160 - $TiO_2$ ® | Kronos | (titanium dioxide) |
| 2.2 Maglite DE - MgO ® | Merck | (magnesium oxide) |

Preparation took place without Alresen PA 565® at 180° C. in a compounder with inward passage of $CO_2$. Subsequently, the mixture was cooled to 150° C. and Alresen PA 565® was added and briefly incorporated homogeneously. The composition was extruded to a 0.2±0.1 mm thick film, which is lined with release paper on one side and cut into rolls. The tensile strength of a bond with this formulation was:

about 160 N/cm (in the tensile test, specimens to DIN EN 20527/2)

Formulations without Alresen 565 (with Pentalyn H instead) gave values under the same conditions of about 60 $N/mm^2$. Sample bonds of Al to Al (ground) at 180° C./1 h under gentle applied pressure from a heated press gave bond strengths of about 10 $N/mm^2$ and are therefore within the range of structural adhesives (tesa Power-Strip® strengths are within the order of magnitude of 3.0–4.0 $N/mm^2$).

Storage test of the samples in 1:1 mineral spirit 60/95: acetone (24 h/RT):

| | | |
|---|---|---|
| Tape: | 120° C. curing/1 h | soluble |
| | 150° C. curing/1 h | swollen |
| | 180° C. curing/1 h | insoluble |

Under appropriate curing conditions, therefore, solvent fastness is obtained.

What is claimed is:

1. A roll of double-sided adhesive tape, said double-sided adhesive tape comprising an adhesive composition comprising a mixture of the following ingredients:
   a) thermoplastic rubber,
   b) one or more tackifier resins; and
   c) one or more reactive resins;
wherein a piece of said double-side adhesive tape, when adhered to a substrate with heat curing, forms a structural adhesive bond to said substrate.

2. The roll of double-sided adhesive tape according to claim 1, wherein the reactive resin is a reactive alkyl phenol resin.

3. The roll of double-sided adhesive tape according to claim 1, wherein the reactive resin is a heat-activatable resin.

4. The roll of double-sided adhesive tape according to claim 1, wherein the reactive resin makes up from 10–30% by weight of the adhesive composition.

5. The roll of double-sided adhesive tape according to claim 4, wherein the reactive resin makes up from 15–25% by weight of the adhesive composition.

6. The roll of double-sided adhesive tape according to claim 1, wherein the adhesive composition further comprises a metal oxide.

7. The roll of double-sided adhesive tape according to claim 6, wherein the metal oxide is magnesium oxide.

8. The roll of double-sided adhesive tape according to claim 6, wherein the metal oxide makes up from 1 to 3% by weight of the adhesive composition.

9. The roll of double-sided adhesive tape according to claim 8, wherein the metal oxide makes up from 1.5 to 2.5% by weight of the adhesive composition.

10. The roll of double-sided adhesive tape according to claim 1, wherein the adhesive composition is formulated so as to be adhesive.

11. The roll of double-sided adhesive tape according to claim 1, wherein the adhesive composition further comprises at least one of antioxidants, UV stabilizers, colorants and fillers.

12. The roll or double-sided adhesive tape according to claim 1, which has a thickness of 0.2±0.1 mm.

13. The roll of double-sided adhesive tape according to claim 1, wherein the thermoplastic rubber is a styrene-butadiene block polymer, and the tackifier is a rosin derivative.

14. The roll of double-sided adhesive tape according to claim 1, wherein the mixture of ingredients is a kneaded and extruded mixture.

15. The roll of double-sided adhesive tape according to claim 1, wherein a piece of said double-sided adhesive tape, when adhered to a substrate with heat curing, forms a structural adhesive bond to said substrate of >100 $N/cm^2$ shear strength.

16. The roll of double-sided adhesive tape according to claim 15, wherein a piece of said double-sided adhesive tape, when adhered to a substrate with heat curing, forms a structural adhesive bond to said substrate of about 160 $N/cm^2$ shear strength.

17. A piece of double-sided adhesive tape cut from a roll according to any one of claims 1 to 16, said piece of double-sided adhesive tape not being applied to a substrate.

18. A method of producing a permanent adhesive bond on a substrate, said method comprising providing a piece of double-sided adhesive tape according to claim 17, and applying said piece of adhesive tape to said substrate with heat curing.

* * * * *